United States Patent
Surendran et al.

(10) Patent No.: US 9,455,064 B2
(45) Date of Patent: Sep. 27, 2016

(54) CERAMIC FILLED FLUOROPOLYMER COMPOSITIONS, METHODS AND APPLICATIONS THEREOF

(71) Applicants: The Secretary, Dept. of Electronics and IT, Govt. of India, New Delhi (IN); Centre for Materials for Electronics Technology (C-MET), Thrissur, Kerala (IN)

(72) Inventors: Rajesh Surendran, Kerala (IN); Murali Kodakkattumana Purushothaman, Kerala (IN); Ratheesh Ravendran, Kerala (IN)

(73) Assignees: Centre for Materials for Electronics Technology (C-MET), Thrissur (IN); The Secretary, Dept. of Electronics and IT, Govt. of India, New Delhi (IN)

( * ) Notice: Subject to any disclaimer, the term of this patent is extended or adjusted under 35 U.S.C. 154(b) by 107 days.

(21) Appl. No.: 14/104,002

(22) Filed: Dec. 12, 2013

(65) Prior Publication Data

US 2014/0162065 A1    Jun. 12, 2014

(30) Foreign Application Priority Data

Dec. 12, 2012 (IN) .......................... 3815/DEL/2012

(51) Int. Cl.
*H01B 3/12* (2006.01)
*B32B 15/08* (2006.01)

(52) U.S. Cl.
CPC ................ *H01B 3/12* (2013.01); *B32B 15/08* (2013.01); *Y10T 428/2982* (2015.01); *Y10T 428/3154* (2015.04)

(58) Field of Classification Search
CPC ... H01B 3/12; B32B 15/08; Y10T 428/3154; Y10T 428/2982
See application file for complete search history.

(56) References Cited

U.S. PATENT DOCUMENTS

| | | | |
|---|---|---|---|
| 4,996,097 A | 2/1991 | Fischer | |
| 5,223,568 A | 6/1993 | Landi et al. | |
| 5,358,775 A * | 10/1994 | Horn, III | B32B 15/08 361/750 |
| 5,739,193 A | 4/1998 | Walpita et al. | |
| 5,965,273 A | 10/1999 | Walpita et al. | |
| 6,534,348 B1 * | 3/2003 | Moise | H01L 29/045 257/72 |
| 2011/0227796 A1* | 9/2011 | Kuroda | C01G 23/00 343/700 MS |

OTHER PUBLICATIONS

Kim et al., "Dielectric Properties of A-Site Deficient Perovskite-Type Lanthanum—Calcium—Titanium Oxide Solid Solution System", Materials Research Bulletin, 30, pp. 307-316, 1995.*

* cited by examiner

*Primary Examiner* — Alexandre Ferre
*Assistant Examiner* — Elaine M Vazquez
(74) *Attorney, Agent, or Firm* — Harness, Dickey & Pierce, P.L.C.

(57) ABSTRACT

Circuits characterized by plural conductive paths supported on a non-conductive substrate are provided. Ceramic filler compositions and methods for preparing the ceramic filler compositions are also provided. Further, fluoropolymer-ceramic filler compositions and their laminates along with their respective methods for their preparation are provided. The fluoropolymer-ceramic filler compositions provide for excellent properties for dielectric constant, loss tangent and temperature coefficient of dielectric constant. In addition, electrical substrate materials having a conductive outer layer supported on a thin sheet of insulating material are also provided.

24 Claims, 4 Drawing Sheets

(A)

(B)

CERAMIC FILLED FLUOROPOLYMER COMPOSITIONS, METHODS AND APPLICATIONS THEREOF

TECHNICAL FIELD

The present disclosure is in the field of electrical circuits and particularly to circuits characterized by plural conductive paths supported on a non-conductive substrate. The disclosure relates to ceramic filler compositions and methods for preparing said compositions. Further, the present disclosure discloses fluoropolymer-ceramic filler compositions and their laminates along with their respective methods for preparing the same. Said fluoropolymer-ceramic filler compositions provide excellent properties for dielectric constant, loss tangent and temperature coefficient of dielectric constant. In addition, electrical substrate materials comprising of a conductive outer layer supported on a thin sheet of insulating material is also disclosed.

BACKGROUND AND PRIOR ART OF THE DISCLOSURE

In the field of electrical circuits, manufacture of dielectric laminates and microwave circuit performance, temperature stability of the dielectric constant (TCK) is an important parameter. The dielectric constant of high dielectric ceramics changes with temperature. As a result, the effective dielectric constant of the composites comprising of polymer and ceramic filler also changes with temperature. The change in temperature during circuit operation affects the electrical properties of electronic components utilizing the compositions, such as, for example, the operating frequency of a patch antenna. This may limit the usefulness of the electronic devices, since they are only usable within limited temperature ranges. In particular, the Outdoor use may be unreliable.

This problem has so far been tried to be addressed by several prior arts which disclose compositions of polymer filled with more than one particulate ceramic material to control the temperature coefficient of dielectric constant (TCK). This approach is described in U.S. Pat. No. 5,358,775 wherein a high dielectric constant (K≥4), low temperature coefficient of dielectric constant (TCK≤150 ppm/° C.) electrical substrate material comprising a fluoropolymer filled with Class 1 capacitor material such as barium neodymium titanate together with secondary fillers such as silica and alumina is disclosed. The same approach is extended in U.S. Pat. No. 5,552,210 wherein, a high dielectric constant (K≥5) and comparatively low thermal coefficient (TCK<200 ppm/° C.) polymeric composite matrix is disclosed using particulate fillers such as titania, magnesia, alumina etc. incorporated in the fluoropolymeric matrix to tune the dielectric properties. Further, high capacitance laminates made of thin films comprising polytetrafluoroethylene filled with large amounts of dielectric filler (25 to 85 vol %), in which the films are plated or clad with conductive material are disclosed in U.S. Pat. No. 4,996,097. The high dielectric fillers which are used include $TiO_2$, $BaTiO_3$ or a Ferro-electric complex.

Temperature stable substrate materials have also been developed in the ceramic filled non-fluoropolymeric based systems which is disclosed in U.S. Pat. No. 5,223,568 wherein, a ceramic filler blend comprising of barium nonotitanate and silica is incorporated in the poly(1,2-butadiene) liquid resin.

A polymer composition having high dielectric constant has been disclosed in U.S. Pat. No. 5,739,193 which is made from poly (phenylene sulfide) (PPS), a thermoplastic polymer, filled with strontium titanate, barium neodymium titanate, barium strontium titanate/magnesium zirconate etc. as primary fillers and mica as the secondary filler material. In addition, a polymeric composition having a dielectric constant K>4 at 20° C. which varies little with temperature is disclosed in U.S. Pat. No. 5,965,273 wherein, the polymeric composition is made from a polymer or mixture of polymers and a ceramic or a mixture of ceramics where the polymer or mixture of polymers have K in the range of about 1.5 to about 3.5 and TCK which is negative and is between 0 and about −300 ppm/° C. The polymer is selected from a group consisting of poly(phenylene sulfide), cycloolefinic copolymer and mixtures thereof filled with a first ceramic filler material consisting of calcium zirconate, strontium zirconate, $CaTiSiO_5$, $PbZrO_3$, zirconia and mixtures thereof, each having dielectric constant in the range of about 15 to about 200 and TCK>0 up to about 300 ppm/° C. and an optional second ceramic filler comprising of one or more ceramic selected from the group consisting of aluminum oxide, magnesium titanate, mica, silicon dioxide, beryllia, spinel and thoria each having a dielectric constant in the range of about and a TCK>0 up to about 300 ppm/° C. However, the use of secondary fillers which is used to control the TCK of the composite system often adversely affects fine control over dielectric constant, homogeneity, rheology etc. of the composite systems. This is the reason as to why such temperature stable high dielectric thermoplastic composite systems (comprising secondary fillers) are not available in the open market for commercial use.

Hence, there is still a need for better and improved electrical composite substrates which possess extraordinary properties such as high dielectric constant, low dielectric loss and low temperature coefficient of dielectric constant.

The present disclosure aims at overcoming all the aforesaid drawbacks of the prior art.

STATEMENT OF THE DISCLOSURE

Accordingly, the present disclosure relates to ceramic filler selected from a group consisting of calcium strontium nonotitanate and calcium lanthanum titanate; a method of obtaining ceramic filler selected from a group consisting of calcium strontium nonotitanate and calcium lanthanum titanate, said method comprising acts of: a) reacting (i) calcium carbonate, strontium carbonate and titanium dioxide to obtain mixture 1, or (ii) calcium carbonate, lanthanum oxide and titanium dioxide to obtain a mixture 2, b) subjecting the mixture 1 or mixture 2 to calcination to obtain the ceramic filler, c) optionally, mixing the industrially acceptable excipient to the ceramic filler and carrying out silane coating on the ceramic filler; a composition comprising fluoropolymer and ceramic filler, optionally along with industrially acceptable excipient, wherein the ceramic filler is selected from a group consisting of calcium strontium nonotitanate and calcium lanthanum titanate; a method of obtaining a composition comprising fluoropolymer and ceramic filler, optionally along with industrially acceptable excipient, wherein the ceramic filler is selected from a group consisting of calcium strontium nonotitanate and calcium lanthanum titanate, said method comprising acts of mixing the fluoropolymer and the ceramic filler, optionally along with the industrially acceptable excipient to obtain the composition; a laminate made of composition as claimed above; a method of obtaining a laminate as claimed above, said method comprising acts of extruding, calendering and hot pressing the composition to obtain the laminate; and electrical substrate material comprising the laminate as claimed above and at least one layer of metal disposed on at least a portion of said electrical substrate material.

BRIEF DESCRIPTION OF ACCOMPANYING FIGURES

In order that the disclosure may be readily understood and put into practical effect, reference will now be made to exemplary embodiments as illustrated with reference to the accompanying figures. The figures together with a detailed description below, are incorporated in and form part of the specification, and serve to further illustrate the embodiments and explain various principles and advantages, in accordance with the present disclosure where:

DETAILED DESCRIPTION OF THE DISCLOSURE

Figure 1:
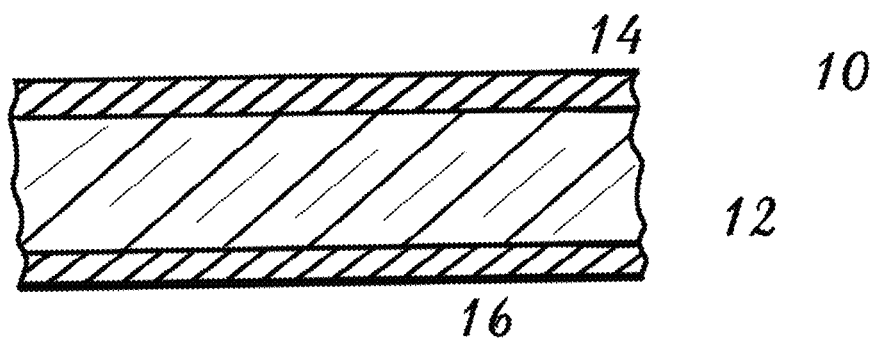
FIG. 1 depicts the schematic representation of electrical composite substrate of the present disclosure.

The present disclosure relates to ceramic filler selected from a group consisting of calcium strontium nonotitanate and calcium lanthanum titanate.

In an embodiment of the present disclosure, the calcium strontium nonotitanate is represented by 2-xCaO-xSrO-9TiO$_2$ wherein 'x' ranges from about 0 to about 2, preferably about 1.5 to about 1.9; and the calcium lanthanum titanate is represented by Ca$_{1-x}$La$_{2x/3}$TiO$_3$ wherein x ranges from about 0.01 to about 0.9, preferably about 0.05 to about 0.3.

In another embodiment of the present disclosure, the ceramic filler has particle size ranging from about 0.8 μm to about 5 μm, dielectric constant ranging from about 112 to about 158 and loss tangent ranging from about 0.0001 to about 0.0005.

The present disclosure further relates to a method of obtaining ceramic filler selected from a group consisting of calcium strontium nonotitanate and calcium lanthanum titanate, said method comprising acts of: a) reacting (i) calcium carbonate, strontium carbonate and titanium dioxide to obtain mixture 1, or (ii) calcium carbonate, lanthanum oxide and titanium dioxide to obtain a mixture 2, b) subjecting the mixture 1 or mixture 2 to calcination to obtain the ceramic filler, c) optionally, mixing the industrially acceptable excipient to the ceramic filler and carrying out silane coating on the ceramic filler.

In an embodiment of the present disclosure, the calcium carbonate in mixture 1 is at a concentration ranging from about 100 grams to about 187 grams, and in mixture 2 is at a concentration ranging from about 80 grams to about 120 grams, the strontium carbonate in mixture 1 is at a concentration ranging from about 130 grams to about 210 grams, the lanthanum oxide in mixture 2 is at a concentration ranging from about 105 grams to about 115 grams and the titanium dioxide in mixture 1 is at a concentration ranging from about 720 grams to about 900 grams, and in mixture 2 is at a concentration ranging from about 75 grams to about 85 grams.

In another embodiment of the present disclosure, the reacting further comprises ball milling for time period ranging from about 20 hours to about 25 hours.

In yet another embodiment of the present disclosure, the step (a) further comprises drying the mixture.

In still another embodiment of the present disclosure, the calcination is carried out for cycles ranging from about one to about three at temperature ranging from about 1140° C. to about 1260° C., and wherein the step (b) further comprises cooling the composition at temperature ranging from about 20° C. to about 30° C.

In still another embodiment of the present disclosure, the industrially acceptable excipient is binder; and wherein the binder is selected from a group comprising polyvinyl alcohol, polyethylene glycol or any combination thereof.

The present disclosure further relates to a composition comprising fluoropolymer and ceramic filler, optionally along with industrially acceptable excipient, wherein the ceramic filler is selected from a group consisting of calcium strontium nonotitanate and calcium lanthanum titanate.

In an embodiment of the present disclosure, the ceramic filler is coated with silane coupling agent in an amount ranging from about 0.2 volume % to about 2 volume %, and wherein the silane coupling agent is selected from a group comprising phenyl trimethoxy silane, vinyl trimethoxy silane, amino ethyl amino trimethoxy silane and a mixture of phenyl trimethoxy silane and amino ethyl amino propyl trimethoxy silane or any combination thereof.

In another embodiment of the present disclosure, the fluoropolymer is having concentration ranging from about 30 volume percent to about 50 volume percent, the ceramic filler is having concentration ranging from about 40 volume percent to about 60 volume percent, the industrially acceptable excipient is having concentration ranging from about 2 volume percent to about 6 volume percent.

In yet another embodiment of the present disclosure, the composition possess dielectric constant ranging from about 12 to about 16, loss tangent ranging from about 0.0018 to about 0.0036 and thermal coefficient of dielectric constant ranging from about −51 ppm/° C. to about −831 ppm/° C.

In still another embodiment of the present disclosure, the composition has particle size ranging from about 1 μm to about 5 μm.

The present disclosure further relates to a method of obtaining a composition comprising fluoropolymer and ceramic filler, optionally along with industrially acceptable excipient, wherein the ceramic filler is selected from a group consisting of calcium strontium nonotitanate and calcium lanthanum titanate, said method comprising acts of mixing the fluoropolymer and the ceramic filler, optionally along with the industrially acceptable excipient to obtain the composition.

In an embodiment of the present disclosure, the calcium strontium nonotitanate is represented by 2-xCaO-xSrO-9TiO$_2$, wherein x ranges from about 0 to about 2, preferably about 1.5 to about 1.9; and the calcium lanthanum titanate is represented by Ca$_{1-x}$La$_{2x/3}$TiO$_3$, wherein x ranges from about 0.01 to about 0.9, preferably about 0.05 to about 0.3.

In another embodiment of the present disclosure, the fluoropolymer is selected from a group comprising polytetrafluoroethylene, hexafluoropropene, tetrafluoropolyethylene and perfluoroalkylvinyl ether or any combination thereof, preferably polytetrafluoroethylene, and the industrially acceptable excipient is glass fiber.

In yet another embodiment of the present disclosure, the glass fiber is selected from a group comprising microglass fiber, alkali free E-glass fiber and alkali free S-glass fiber or any combination thereof.

In still another embodiment of the present disclosure, the fluoropolymer is having concentration ranging from about 30 volume percent to about 50 volume percent, the ceramic filler is having concentration ranging from about 40 volume percent to about 60 volume percent, the industrially acceptable excipient is having concentration ranging from about 2 volume percent to about 6 volume percent.

In still another embodiment of the present disclosure, the mixing is carried out in sigma mixer at speed ranging from about 80 rpm to about 120 rpm and time-period ranging from about 1 hour to about 2 hours.

The present disclosure further relates to a laminate made of composition as claimed above.

The present disclosure further relates to a method of obtaining a laminate as claimed above, said method comprising acts of extruding, calendering and hot pressing the composition to obtain the laminate.

In an embodiment of the present disclosure, the extrusion is carried out with a ram extruder at pressure ranging from about 110 kg/cm$^2$ to about 170 kg/cm$^2$, the calendering is carried out by passing the composition between rollers at speed ranging from about 20 rpm to about 60 rpm, and the hot pressing is carried out in a die at temperature ranging from about 330° C. to about 380° C., pressure ranging from about 110 kg/cm$^2$ to about 180 kg/cm$^2$ and time period ranging from about 8 hours to about 20 hours.

The present disclosure further relates to electrical substrate material comprising the laminate as claimed above and at least one layer of metal disposed on at least a portion of said electrical substrate material.

The present disclosure relates to electrical circuits and particularly to circuits characterized by plural conductive paths supported on a non-conductive substrate. More specifically, this disclosure is directed to the manufacture of dielectric laminates comprising of a conductive outer layer supported on a thin sheet of insulating material.

A high dielectric constant and low loss ceramic filled fluoropolymer based substrate materials are disclosed. The disclosure further relates to the preparation of said high dielectric constant and low loss proprietary ceramic filler materials, wherein the hydrophilic nature of the filler materials is converted to hydrophobic properties through silane coating. The overall compositions comprising fluoropolymer and filler material are prepared through Sigma Mixing, Extrusion, Calendering and Hot pressing (SMECH) processes. The flexible composite substrates thus obtained have dielectric constants of about 11 to about 15, dielectric loss of about 0.0018 to about 0.0036 and temperature coefficient of dielectric constant of about −51 to about −831 ppm/° C. In an embodiment, the flexible composite substrates have dielectric constants of about 12 to about 16, preferably 15; dielectric loss of about 0.0019 to about 0.0030, preferably 0.002 and temperature coefficient of dielectric constant of about −25 to about 400 ppm/° C., preferably +20 ppm/° C. Said composites are copper cladded through vacuum lamination and/or electroless plating followed by electroplating and are ideally suited for printed circuit boards (PCBs). The resulting PCBs exhibit improved electrical performance in terms of dielectric constant and temperature coefficient of dielectric constant over existing printed circuit boards.

In an embodiment of the present disclosure, a ceramic filled fluoropolymeric composite having dielectric constant greater than 14 and a loss tangent less than 0.0023 with little change in dielectric constant with respect to temperature (of about 0-100° C.) is disclosed. A dielectric constant of greater than 10 is particularly desirable in such materials for reducing the circuit size. It is also important that the PCB substrate materials exhibit a low thermal coefficient of dielectric constant (TCK) together with high dielectric constant (K). The dielectric properties of thin laminates disclosed in the present disclosure are measured in the X-band frequency region using waveguide cavity perturbation technique.

In another embodiment of the present disclosure, a fluoropolymer containing composite material is disclosed. The composite materials further comprise about 30 to 60 volume % of ceramic filler material with respect to the weight of the composite material, to tailor the dielectric properties of the final circuit laminates. The ceramic filler material is uniformly distributed in fluoropolymeric matrix through SMECH process. The composite also contains about 2 to 6 volume % of microfibre glass for reinforcement purpose. Said composite material exhibits a dielectric constant (K) up to 15 and a TCK of less than 200 ppm/° C.

In another embodiment of the present disclosure, the fluoropolymer matrix of the composite material comprises any fluoropolymer that exhibits a low dielectric constant (K=1.8-4.2), low loss (tan δ=0.01-0.0003) and relatively high service temperature (about 50-280° C.). In still another embodiment, the fluoropolymer having dielectric constants of about 1.8 to about 2.55, preferably 2.1; dielectric loss of about 0.005 to about 0.0002, preferably 0.0003 and service temperature of about 20° C. to about 280° C., preferably up to 250° C. is chosen. Polytetrafluoroethylene (PTFE), hexafluoropropene (HFP), tetrafluoropolyethylene (TFE), and perfluoroalkylvinyl ether (PAVE) are some of the examples of suitable fluoropolymer matrix materials. In a preferred embodiment, Polytetrafluoroethylene (PTFE) is the fluoropolymer matrix material.

In yet another embodiment of the present disclosure, the ceramic filler material of the present disclosure comprises hydrophobic phase pure 2-xCaO-xSrO-9TiO$_2$ and Ca$_{1-x}$La$_{2x/3}$TiO$_3$ ceramic fillers with particle size ranging from about 0.8 μm to about 5 μm. In still another embodiment, the present disclosure comprises ceramic fillers with particle size of about 0.8 μm to about 10 μm, preferably 5 μm. In a preferred embodiment, 2-xCaO-xSrO-9TiO$_2$ filler material in the composition is found to be particularly suitable owing to its high dielectric constant (K=117-160) and low loss tangent (tan δ=0.0001-0.0005). In still another embodiment, the ceramic filler of the present disclosure has dielectric constant of about 120 to about 160, preferably 156 and loss tangent of about 0.0001 to about 0.0005, preferably 0.00015.

In another embodiment of the present disclosure, the ceramic filler is coated with a silane coating material which renders the surface of the filler hydrophobic thereby precluding undesirable water absorption into the composite substrates. The silane coatings also contribute unexpected improvements to substrate/copper adhesion, strength and dimensional stability. In the present disclosure, the ceramic filler is coated with silane coupling agent in an amount ranging from about 0.2 volume % to about 2 volume % and the silane coupling agents are selected from a group of p-chloromethyl phenyl trimethoxy silane, amino ethyl amino trimethoxy silane and a mixture of phenyl trimethoxy silane and amino ethyl amino propyl trimethoxy silane. In still another embodiment, the preferred silane coupling agents are vinyl trimethoxy silane and phenyl trimethoxy silane and are present in an amount ranging from about 0.5 volume % to about 2.5 volume %, preferably 2 volume %.

In still another embodiment of the present disclosure, the inorganic filler particles comprise of about 30 to 70 volume % of the composite material of the present invention. In a preferred embodiment, the weight of the inorganic filler particles ranges from about 35 volume % to about 65 volume % of the composite material of the present disclosure, preferably 48 volume %. In a preferred embodiment, composition of the present disclosure comprises from about 40 volume % to about 65 volume % of the inorganic filler material preferably 50 volume %.

Additional embodiments and features of the present disclosure will be apparent to one of ordinary skill in art based upon description provided herein. However, the examples and the figures should not be construed to limit the scope of the present disclosure.

Materials Used for Arriving at the Examples of the Instant Disclosure:

PTFE powder sold by M/s. Hindustan Fluorocarbon Limited, Hyderabad, India under the trade name H71 A is used. Microfiber glass is obtained from M/s Binani glass, Goa, India. JD1 grade copper foils are obtained from M/s Gould Electronics, Germany. M/s. Shipley, Germany make chemical solutions are used for the electroless and electroplating processes.

Example 1

Preparation of Ceramic Filler Compositions (a) The ceramic filler compositions, calcium strontium nonotitanate [2-xCaO-xSrO-9TiO$_2$ (0≤x≤2)] system are prepared by allowing to react high purity calcium carbonate (CaCO$_3$), strontium carbonate (SrCO$_3$) and titanium dioxide (TiO$_2$) powder through the solid state ceramic route. The powders are weighed according to the stoichiometry (CaCO$_3$=100 gm-187 gm, SrCO$_3$=130 gm-210 gm, TiO$_2$=720 gm-900 gm), ball milled for about 20 hours-25 hours in distilled water medium in a polypropylene bottle using zirconia balls. The mixture is dried and calcined at temperature of about 1140° C. to about 1260° C. by single or repeated calcination for different durations and cooled to room temperature (of about 20° C.-30° C.). The calcined powder is ground well and about 5 wt. % Polyvinyl alcohol (PVA) is added as the binder, dried and subsequently ground. The resultant powder is uniaxially pressed in cylindrical shape having a diameter of about 9 mm-16 mm and height of about 5 mm-10 mm, suitable for microwave measurement. The sintering of the cylindrical compact is carried out at different temperatures ranging from about 1350° C.-1400° C. The sintered samples are polished well to avoid any surface irregularities and are used for structural and dielectric property measurements. The low frequency (<13 MHz) dielectric properties of the prepared ceramic filler samples are measured using an impedance analyzer. Highly conducting silver paste is applied on both surfaces of the sintered ceramic compacts and copper leads are fixed on both sides for the dielectric constant measurements. The microwave dielectric constant is measured using Hakki & Coleman dielectric post resonator method wherein, the resonator is placed between two gold coated copper plates and microwave energy is coupled through E-field probes to excite various resonant modes. TE$_{011}$ mode is selected carefully from the resonant spectrum for the dielectric constant measurements. The end members of ceramic fillers have a dielectric constant of 117 and 158 with a loss tangent of 0.0001 and 0.0005 respectively for Ca and Sr compositions.

(b) In another embodiment, the ceramic filler compositions, calcium lanthanum titanate [Ca$_{1-x}$La$_{2x/3}$TiO$_3$ (0.05≤x≤0.3)] system are prepared by allowing to react high purity calcium carbonate (about 80 gm-120 gm), lanthanum oxide (about 105 gm-115 gm) and titanium dioxide (about 75 gm-85 gm) powders through the solid state ceramic route similar to the process described in example 1(a). The mixture is calcined at a temperature of about 1150° C.-1250° C. and sintered at about 1300° C.-1400° C. The sintered samples are polished well to avoid any surface irregularities and are used for structural and dielectric property measurements. The low frequency (<13 MHz) dielectric properties of the prepared ceramic filler samples are measured using an impedance analyzer. Highly conducting silver paste is applied on both surfaces of the sintered ceramic compacts and copper leads are fixed on both sides for the dielectric constant measurements. The microwave dielectric constant is measured using Hakki & Coleman dielectric post resonator method wherein, the resonator is placed between two gold coated copper plates and microwave energy is coupled through E-field probes to excite various resonant modes. TE$_{011}$ mode is selected carefully from the resonant spectrum for the dielectric constant measurements. The end members of ceramic fillers have a dielectric constant of 120 and 145 with a loss tangent of 0.0008 and 0.0001 respectively for La and Ca compositions.

Figure 2:
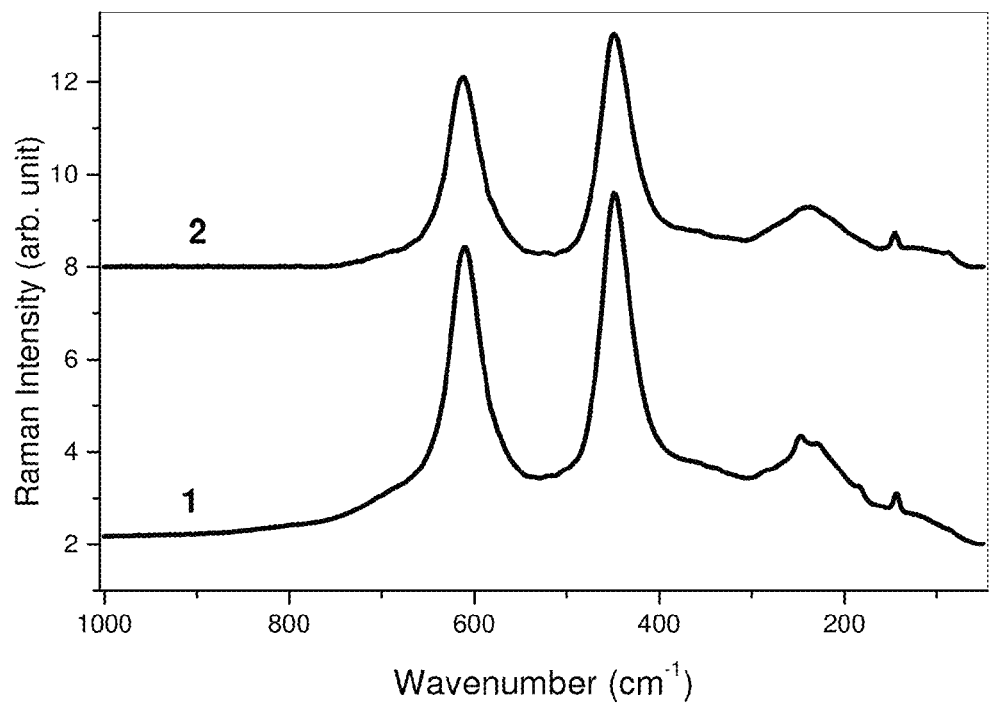
FIG. 2 depicts the Laser Raman Spectra of typical 2-xCaO-xSrO-9TiO$_2$ ceramic particulate fillers.
Figure 3:
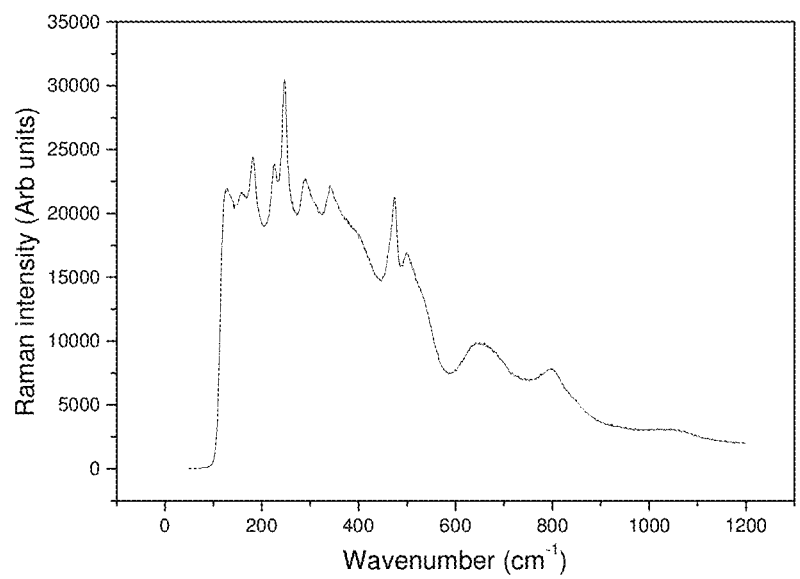
FIG. 3 depicts the Laser Raman Spectra of typical Ca$_{1-x}$La$_{2x/3}$TiO$_3$ ceramic fillers.

FIGS. 2 and 3 depict the Laser Raman Spectra of the typical ceramic particulate fillers of the present disclosure.

Example 2

Preparation of Fluoropolymer-Ceramic Filler Composites

A series of composites comprising of polytetrafluoroethylene (PTFE), 2-xCaO-xSrO-9TiO$_2$ (1≤x≤2) and alkali free E-glass fiber (microfiber glass) are made. Theoretical modeling (based on the modified Lichtenecker-Rother approach) is employed to arrive at the desired composite ratio (for example, PTFE=60-80 gms, 2-xCaO-xSrO-9TiO$_2$ (1≤x≤2)=120-136 gms, Microfiber glass=4-8 gms, Lubricant=124-160 ml) which provides the required dielectric properties. Being a heterogeneous system, the effective dielectric constant of the ceramic filled PTFE composites is predicted using modified Lichtenecker-Rother approach (Equation 1) by judiciously accounting the depolarization of the particulate filler, shape factor, the effect of interface region, ceramic-ceramic connectivity and other similar factors.

$$\log\varepsilon_c = v_f\log\varepsilon_f + v_m(1-k)\log\left(\frac{\varepsilon_m}{\varepsilon_f}\right) \qquad [\text{Equation 1}]$$

where $v_f$, $v_p$, are the volume fractions and $\in_f$, $\in_m$ are the dielectric constant of the filler and matrix respectively, k is the fitting factor and $\in_c$ is the effective dielectric constant of the composite.

In an exemplary embodiment, dimensionally stable ceramic filled PTFE laminates of the present disclosure are prepared through Sigma Mixing, Extrusion, Calendering followed by Hot pressing (SMECH) process. In the said process, the starting materials (PTFE, ceramic filler and microfiber glass) are initially mixed well (for example, PTFE=60-80 gms, 2-xCaO-xSrO-9TiO$_2$ (1≤x≤2)=120-136 gms, Microfiber glass=4-8 gms) in the presence of a lubricant preferably Di propylene Glycol (about 124-160 ml) through sigma mixing. Said mixing of the ingredients is performed in a Sigma Mixer having counter rotating blade rotating at about 80-120 rpm for about 1 to 2 hours. The finely mixed dough at this stage has an average particle size ranging from about 2 to 5 μm which is measured using a particle size analyzer. The said mixed dough is then subjected to paste extrusion at a pressure of about 110-170 kg/cm$^2$ using a ram extruder to obtain preforms of size of about 4 to 8 cm (width)×2 mm to 4 mm (thick). The preforms thus obtained are calendered by passing the preforms through the rollers of a calendering machine which has an rpm ratio of about 1:1.2 (roller speed of about 20 to 60 rpm) for imparting better shear force. Green tapes of less than 100 μm having uniform filler distribution are calendered without having pinholes. The calendered tapes are stacked one over the other and placed inside the stainless steel die for hot pressing at temperature ranging from about 330° C. to about 380° C., pressure ranging from about 110 Kg/cm$^2$ to about 180 Kg/cm$^2$ and for a time period of about 8-20 hours to obtain pore free and dimensionally stable laminates having desired final thickness (about 625 to 1600 μm thick and a width ranging from about 150 to 200 mm). The processes sigma mixing, extrusion and calendering ensure uniform distribution of the filler in the PTFE matrix, whereas, hot pressing of the stacked calendered tapes inside stainless steel die results in homogeneous and dimensionally stable PTFE laminates.

While preferred embodiments have been shown and described, various modifications and substitutions may be made thereto without departing from the spirit and scope of the present disclosure. Accordingly, it is to be understood that apart from polytetrafluoroethylene (PTFE), other fluoropolymers including but not limiting to hexa fluoropropene (HFP), tetrafluoroethylene (TFE), and perfluoro alkyl vinyl ether (PAVE) can be made use by a person of average skill in the art to prepare electrical composite substrates having the ceramic fillers of the present disclosure. Such replacement of one known fluoropolymer with another fluoropolymer is within the scope of the present disclosure and does not require any extraordinary technical effort.

In another embodiment of the present disclosure, the bare hot pressed composite substrates thus obtained are chemically etched to obtain better adhesion to metal surfaces. The PTFE/ceramic substrates are chemically etched using sodium naphthalate based etchant solution. The etchant solution prepared by dissolving naphthalene (about 10-15 wt %) in moisture free tetra hydrofuran (about 80 to 90 wt %) and subsequently adding about 1-4 wt % of metallic sodium. Sodium takes about 3-4 hours to react completely, resulting in the formation of a black coloured etchant solution. The PTFE/ceramic substrates are immersed in the above prepared sodium naphthalene based etching solution for about 0.5 minutes to about 2 minutes and then washed thoroughly with acetone followed by drying for about 1 hour to about 2 hours. Post etching, copper foils are vacuum laminated to the surface of the flat composites. Alternately, the metallic conductor layer over the composite substrates are build up through electroless and electroplating processes. The electroless plating followed by electroplating is done for the chemically etched substrate as follows: the chemically etched PTFE/ceramic substrate is dipped in the Cleaner conditioner (about 95% DI water and about 5% Cleaner conditioner 3233) bath for about 10±1 minutes at about 43±3° C. followed by rinsing with water for about 20-40 seconds at room temperature (about 20° C.-30° C.). Then, the sample is pre-activated by immersing in a pre-activator bath [CATAPOSIT PRE-DIP 404] at room temperature of about 20° C.-30° C. for a time-period of about 2 to 3 hours followed by rinsing with water. The pre-activated sample is now again immersed in an activator bath (CATAPOSIT PRE-DIP 404 and CATAPOSIT 44) for about 5 to 10 minutes at about 40 to 45° C. followed by thorough water rinse. The pre-activated sample is now subjected to electroless copper plating on activated substrate using CIRCUPOSIT EL COPPER 3350 M, CIRCUPOSIT EL 3350 A and CIRCUPOSIT EL COPPER 3350 B for about 20 to 30 minutes at temperature ranging from about 40 to about 45° C. The electroless plated substrate is then rinsed thoroughly with water for about 10-20 minutes. On the other hand, electroplating process is carried out in a standard electroplating bath @ about 0.5 micrometer/minute.

The FIG. 1 represents filled fluoropolymeric circuit laminate of the present disclosure (denoted as 10). 12 represents the dielectric composite laminate placed between the copper conducting layers (represented by 14 and 16).

Figure 4:
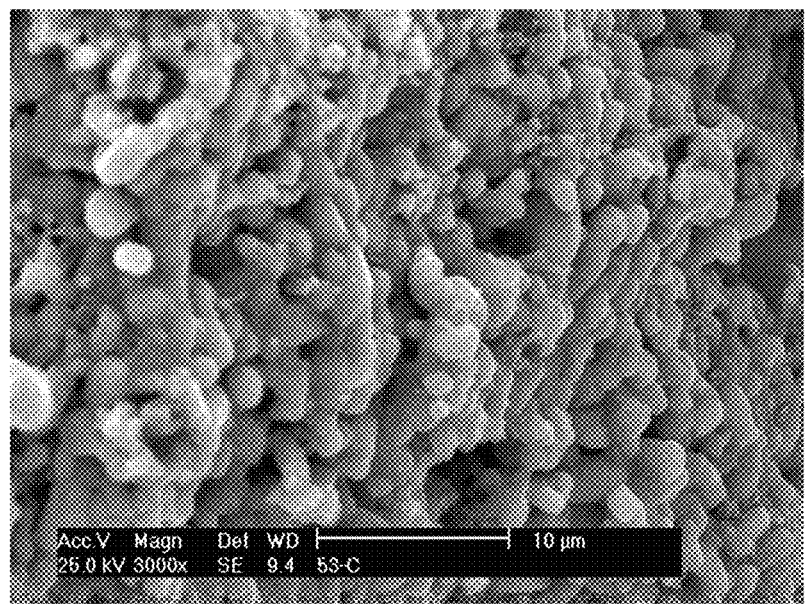
FIG. 4 depicts the cross sectional SEM image of typical hot pressed PTFE/2-xCaO-xSrO-9TiO$_2$/microfiber glass composite substrate.
Figure 5:
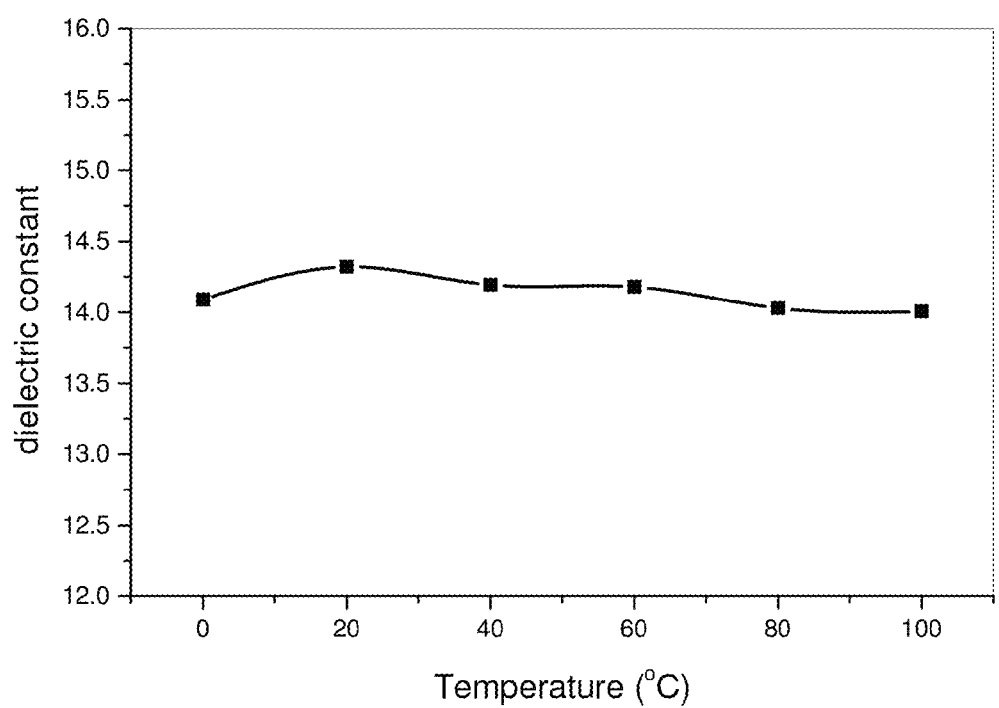
FIG. 5 depicts the temperature variation versus dielectric constant (K) of a typical PTFE/2-xCaO-xSrO-9TiO$_2$/microfiber glass composite substrates of the present disclosure.

FIG. 4 depicts the cross sectional SEM image of hot pressed composite substrates of the present disclosure. The cross section micrograph of the composite substrate shows uniform distribution of filler in the PTFE matrix. Also, dense microstructure together with good filler/matrix interface can be observed in the SEM Picture. Further, FIG. 5 further depicts the temperature variation of dielectric constant (TCK) of temperature stable composite substrates of the present disclosure. The figure showcases that the composite substrates of the present disclosure are stable at a temperature of about 0° C. to about 100° C.

Figure 6:
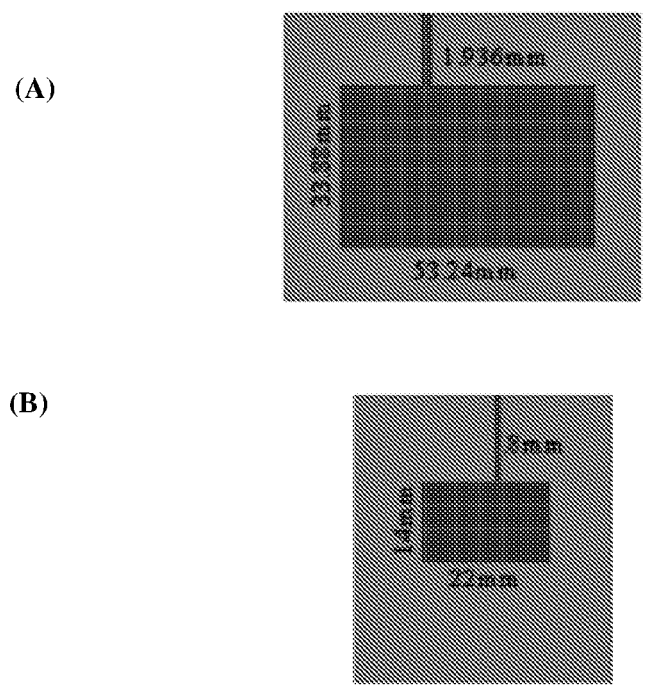
FIG. 6 depicts the comparison of the simulation result of patch antennas using commercially available microwave substrate having a dielectric constant of 2.2 and loss tangent of 0.002 (A) and the high dielectric microwave substrates (K=13) and loss tangent of 0.002 of the present disclosure (B).

FIG. 6 shows a comparison between simulation result of patch antenna using commercially available microwave substrate having dielectric constant of 2.2 and loss tangent of 0.002 & high dielectric substrates (K=13) of the present disclosure. The figure shows that the patch antenna made using the composite substrate of the present disclosure is considerably less in size compared to the one fabricated using commercially available substrates.

Figure 7:
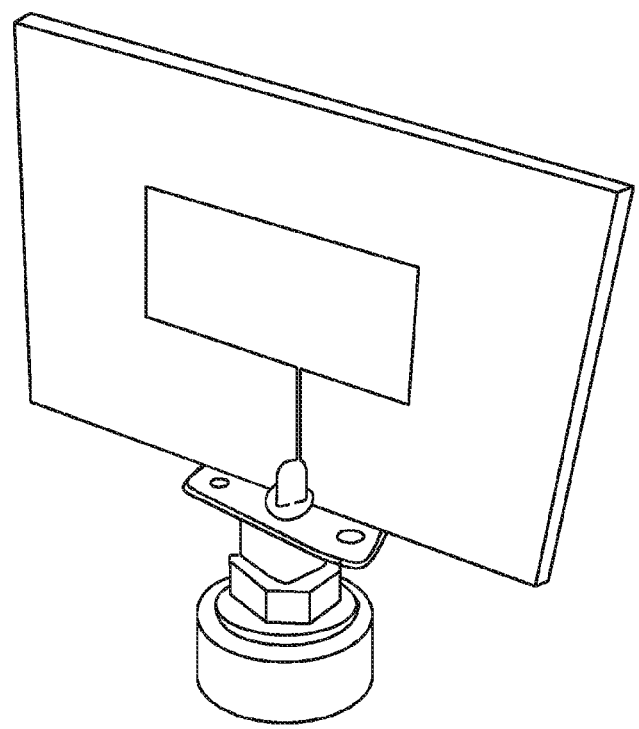
FIG. 7 depicts the photograph of miniaturized patch antenna fabricated using microwave composite substrate of the present disclosure having a dielectric constant of 13 and loss tangent of 0.002.

FIG. 7 shows a photograph of miniaturized patch antenna fabricated using the composite substrate of the present disclosure having a dielectric constant of 13 and loss tangent of 0.002.

Example 3

Properties of PTFE-Ceramic Filler Composites (a) PTFE-2-xCaO-xSrO-9TiO$_2$ Composites PTFE-2-xCaO-xSrO-9TiO$_2$ composite samples (Sample A) are prepared using 33.5 gms of xCaO-ySrO-9TiO$_2$ (0.5≤x≤0.7, 1.5≤y≤1.3) filler, 15.5 gms of PTFE, 1 gm of micro fiber glass (E-glass) and 0.5 ml of Poly acrylic acid (surfactant). The constituents are mixed well and the circuit laminates are prepared through SMECH process as described in Example 2.

PTFE-2-xCaO-xSrO-9TiO$_2$ (Sample B) is prepared using 33.5 gms of calcium strontium titanate xCaO-ySrO-9TiO$_2$ (0≤x≤0.2, 1.8≤y≤2) filler, 15.5 gms of PTFE, 1 gm of micro fiber glass and ml of lubricant (Di propylene Glycol). Further, sample C is prepared using 2SrO-9TiO$_2$ and with the same filler to PTFE ratio (i.e. 33.5 gms of 2SrO-9TiO$_2$ and 15.5 gms of PTFE) under the same conditions. In an embodiment, the microwave dielectric properties of the samples obtained are measured in the X-band region using waveguide cavity perturbation technique and the results are given in table 1. In the X-band waveguide cavity perturbation technique, the frequency (f$_c$) and quality factor (Q$_c$) of each resonant modes of the empty cavity is measured first. Then the sample is introduced in to the cavity and each resonant mode is perturbed. The sample inside the cavity is moved within the cavity to get maximum deflection of the resonant mode from the initial position. The resonant frequency (f$_s$) and quality factor (Q$_s$) at maximum perturbed position are noted. Using these values the real and imaginary parts of dielectric constant is calculated using Equations 2 and 3.

$$\varepsilon'_r = 1 + \frac{f_c - f_s}{2f_s}\left(\frac{Vc}{Vs}\right) \quad \text{(Equation 2)}$$

$$\varepsilon'' = \frac{Vc}{4Vs}\left(\frac{Q_c - Q_s}{Q_c Q_s}\right) \quad \text{(Equation 3)}$$

TABLE 1

Microwave dielectric properties of PTFE/
2-xCaO—xSrO—9TiO$_2$/E-glass composite system

| Sample | K | tanδ | TCK(ppm/° C.) |
|---|---|---|---|
| A | 14.6 | 0.0018 | −51 |
| B | 14.9 | 0.0021 | −232 |
| C | 15.2 | 0.0022 | −159 |

The above table 1 illustrates that different samples of PTFE/2-xCaO-xSrO-9TiO$_2$ composites exhibit excellent dielectric constant, loss tangent and thermal coefficient of dielectric constant results which is in the range of about 14-16, 0.0018-0.0022 and −51 to −159 respectively. Therefore, the composites prove to be improved and excellent materials for electrical applications.

(b) PTFE-Ca$_{1-x}$La$_{2x/3}$TiO$_3$ Composites

Composites of polytetrafluoroethylene (PTFE), Ca$_{1-x}$La$_{2x/3}$TiO$_3$ (x=0.1) and alkali free microfiber glass fiber are prepared via. SMECH process as described in Example 2. Sample A is prepared by blending 30.69 gms of PTFE with 66.33 gms of Ca$_{1-x}$La$_{2x/3}$TiO$_3$ and 1.98 gms of microfiber glass. The constituents are mixed well and circuit laminates are prepared through the SMECH process. The same processes are repeated with 67.55 gm of Ca$_{1-x}$La$_{2x/3}$TiO$_3$ (x=0.12), 30.89 gm of PTFE, and 1.46 gms of microfiber glass for sample B and 69.42 gm of Ca$_{1-x}$La$_{2x/3}$TiO$_3$ (x=0.9), 29.32 gm of PTFE, and 1.26 g of microfiber glass for sample C respectively.

The microwave dielectric properties of the laminated composite substrates are measured in the X-band region using waveguide cavity perturbation technique and results are compiled in Table 2.

TABLE 2

Microwave dielectric properties of
PTFE/Ca$_{1-x}$La$_{2x/3}$TiO$_3$/E-glass fiber composite system

| Sample | K | tanδ | TCK (ppm/° C.) |
|---|---|---|---|
| A | 12.8 | 0.0028 | −480 |
| B | 13.8 | 0.0031 | −623 |
| C | 14.6 | 0.0036 | −831 |

The above table 2 illustrates that different samples of PTFE/Ca$_{1-x}$La$_{2x/3}$TiO$_3$ composites exhibit excellent dielectric constant, loss tangent and thermal coefficient of dielectric constant results which is in the range of about 12 to 15, 0.0028 to 0.0036 and −480 to −831 respectively. Therefore, the composites prove to be improved and excellent materials for electrical applications.

In an embodiment of the present disclosure, the 'x' values of calcium strontium nonotitanate (2-xCaO-xSrO-9TiO$_2$) range from about 0 to about 2, preferably about 1.5 to about 1.9 and the 'x' values of calcium lanthanum titanate (Ca$_{1-x}$La$_{2x/3}$TiO$_3$) range from about 0.01 to about 0.9, preferably about 0.05 to about 0.3.

Example 4

Comparative Study of Fluoropolymer-Filler Composites of the Present Disclosure with Currently Available Composites Table 3 provides a comparative data showcasing the advantages of the composite material of the present disclosure with respect to the currently available materials.

TABLE 3

Comparative study of various composite materials-

| Composite system | Dielectric constant ($\varepsilon_r$) at 10 GHz | Loss tangent (tan δ) at 10 GHz | Temperature coefficient of dielectric constant ($\tau_{\varepsilon_r}$) (ppm/° C.) |
|---|---|---|---|
| RT/duroid 6010 | 10.2 ± 0.25 | 0.0023 | −425 |
| RO3010 ™ | 10.2 ± 0.30 | 0.0022 | −280 |
| RO3210 ™ | 10.2 ± 0.30 | 0.0027 | −459 |
| TMM101 | 9.8 ± 0.245 | 0.002 | −43 |
| AD 1000 | 10.2 ± 0.30 | 0.0023 | −380 |
| Fluoropolymer-Filler Composites of the present disclosure | 14.6 ± 0.30 | 0.0018 | −51 to −831 |

As observed from the above table, the composite material of the present disclosure is superior in all the properties such as dielectric constant, loss tangent, temperature coefficient of dielectric constant and temperature stability and is able to successfully overcome the various drawbacks to provide for improved products when compared to the currently available materials. In other words, the major advantages showcased by the composite substrates of the present invention involves the size reduction of microwave antennas and circuits because of the high dielectric constant which is stable with varying temperature when compared to commercially available materials. For example, miniaturized patch antennas can be deployed in space which reduces the payload in satellites. In addition, low temperature coefficient of dielectric constant of the present composites enable them to use for various outdoor wireless applications.

The composite materials of the present disclosure can be employed in numerous electrical applications such as printed circuit boards (PCBs), wireless communication applications such as mobile base station applications, patch antennas, satellite communications, wireless cable TV and local loop antenna systems. The composite substrates can also be used for GPS, filters and couplers, ground radar surveillance systems, power amplifiers, low noise amplifiers and collision avoidance system and many other applications.

In conclusion, the present disclosure introduces fluoropolymer-filler substrate materials having high dielectric constant and low loss. The preparation of high dielectric and low loss proprietary ceramic filler materials, wherein the hydrophilic nature of the filler materials is converted to hydrophobic properties through silane coating is also disclosed. The overall substrate materials comprising fluoropolymer and filler material are prepared through Sigma Mixing, Extrusion, Calendering and Hot pressing (SMECH) processes. The flexible composite substrates thus obtained have high dielectric constants of 11 to 15, dielectric loss of 0.0018 to 0.002 and temperature coefficient of dielectric constant of −51 to −678 ppm/T. PCBs comprising these substrate materials exhibit improved electrical performance in terms of dielectric constant, loss and temperature coefficient of dielectric constant over existing printed circuit boards.

We claim:

1. A ceramic filler consisting of calcium strontium nonotitanate.

2. The ceramic filler as claimed in claim 1, wherein the calcium strontium nonotitanate is represented by $(CaO)_{2-x}(SrO)_x(TiO_2)_9$ wherein x ranges from about 0 to about 2.

3. The ceramic filler as claimed in claim 1, wherein the ceramic filler has a particle size ranging from about 0.8 µm to about 5 µm, a dielectric constant ranging from about 112 to about 158 and a loss tangent ranging from about 0.0001 to about 0.0005.

4. The ceramic filler as claimed in claim 1, wherein the calcium strontium nonotitanate is represented by $(CaO)_{2-x}(SrO)_x(TiO_2)_9$, wherein x ranges from 1.5 to 1.9.

5. A method of obtaining the ceramic filler of claim 1, said method comprising the steps of:
   a) reacting calcium carbonate, strontium carbonate and titanium dioxide to obtain a mixture;
   b) subjecting the mixture to calcination to obtain the ceramic filler; and
   c) optionally, mixing an industrially acceptable excipient to the ceramic filler and carrying out silane coating on the ceramic filler.

6. The method as claimed in claim 5, wherein the calcium carbonate in the mixture is at a concentration ranging from about 100 grams to about 187 grams, the strontium carbonate in the mixture is at a concentration ranging from about 130 grams to about 210 grams, and the titanium dioxide in the mixture is at a concentration ranging from about 720 grams to about 900 grams.

7. The method as claimed in claim 5, wherein the reacting step further comprises ball milling for a time period ranging from about 20 hours to about 25 hours.

8. The method as claimed in claim 5, wherein step (a) further comprises drying the mixture.

9. The method as claimed in claim 5, wherein the calcination is carried out for cycles ranging from about one to about three at a temperature ranging from about 1140° C. to about 1260° C., and wherein step (b) further comprises cooling the composition at a temperature ranging from about 20° C. to about 30° C.

10. The method as claimed in claim 5, wherein the industrially acceptable excipient is a binder; and wherein the binder is selected from the group consisting of polyvinyl alcohol, polyethylene glycol or a combination thereof.

11. The method as claimed in claim 5, wherein the ceramic filler is coated with a silane coupling agent in an amount ranging from about 0.2 volume % to about 2 volume %, and wherein the silane coupling agent is selected from the group consisting of phenyl trimethoxy silane, vinyl trimethoxy silane, amino ethyl amino trimethoxy silane and a mixture of phenyl trimethoxy silane and amino ethyl amino propyl trimethoxy silane and any combination thereof.

12. A composition comprising a fluoropolymer and a ceramic filler, optionally along with an industrially acceptable excipient, wherein the ceramic filler is calcium strontium nonotitanate.

13. The composition as claimed in claim 12, wherein the fluoropolymer has a concentration ranging from about 30 volume percent to about 50 volume percent, the ceramic filler has a concentration ranging from about 40 volume percent to about 60 volume percent, and the industrially acceptable excipient has a concentration ranging from about 2 volume percent to about 6 volume percent.

14. The composition as claimed in claim 12, wherein the ceramic filler has a particle size ranging from about 1 µm to about 5 µm; and wherein the composition possess a dielectric constant ranging from about 12 to about 16, a loss tangent ranging from about 0.0018 to about 0.0036 and a thermal coefficient of dielectric constant ranging from about −51 ppm/° C. to about −831 ppm/° C.

15. The composition as claimed in claim 12, wherein said composition is obtained by a method comprising acts of mixing the fluoropolymer and the ceramic filler, optionally along with the industrially acceptable excipient to obtain the composition.

16. The composition as claimed in claim 15, wherein the fluoropolymer has a concentration ranging from about 30 volume percent to about 50 volume percent, the ceramic filler has a concentration ranging from about 40 volume percent to about 60 volume percent, and the industrially acceptable excipient has a concentration ranging from about 2 volume percent to about 6 volume percent.

17. The composition as claimed in claim 15, wherein the mixing is carried out in a sigma mixer at a speed ranging from about 80 rpm to about 120 rpm and for a time-period ranging from about 1 hour to about 2 hours.

18. The composition as claimed in claim 12, wherein the calcium strontium nonotitanate is represented by $(CaO)_{2-x}(SrO)_x(TiO_2)_9$, wherein x ranges from about 0 to about 2.

19. The composition as claimed in claim 12, wherein the fluoropolymer is selected from the group consisting of polytetrafluoroethylene, hexafluoropropene, tetrafluoropolyethylene perfluoroalkylvinyl ether, and any combination thereof, and the industrially acceptable excipient is glass fiber; and wherein the glass fiber is selected from the group consisting of microglass fiber, alkali free E-glass fiber, alkali free S-glass fiber, and any combination thereof.

20. The composition as claimed in claim 12, wherein said composition is employed to prepare a laminate; and wherein said laminate is obtained by a method comprising acts of extruding, calendering and hot pressing the composition.

21. The composition as claimed in claim 20, wherein the extrusion is carried out with a ram extruder at a pressure ranging from about 110 kg/cm$^2$ to about 170 kg/cm$^2$, the calendering is carried out by passing the composition between rollers at a speed ranging from about 20 rpm to about 60 rpm, and the hot pressing is carried out in a die at temperature ranging from about 330° C. to about 380° C., a pressure ranging from about 110 kg/cm² to about 180 kg/cm² and for a time period ranging from about 8 hours to about 20 hours.

22. An electrical substrate material comprising the laminate as prepared in claim 20 and at least one layer of metal disposed on at least a portion of said electrical substrate material.

23. The composition as claimed in claim 12, wherein the calcium strontium nonotitanate is represented by $(CaO)_{2-x}(SrO)_x(TiO_2)_9$, wherein x ranges from about 1.5 to about 1.9.

24. The composition as claimed in claim 12, wherein the ceramic filler is coated with a silane coupling agent in an amount ranging from about 0.2 volume % to about 2 volume %, and wherein the silane coupling agent is selected from the group consisting of phenyl trimethoxy silane, vinyl trimethoxy silane, amino ethyl amino trimethoxy silane, a mixture of phenyl trimethoxy silane and amino ethyl amino propyl trimethoxy silane, and any combination thereof.

* * * * *